May 6, 1924.
R. DRUMMOND
1,493,250
DEFLECTOR SUPPORT FOR AUTOMOBILE WINDSHIELDS
Filed Sept. 20, 1922
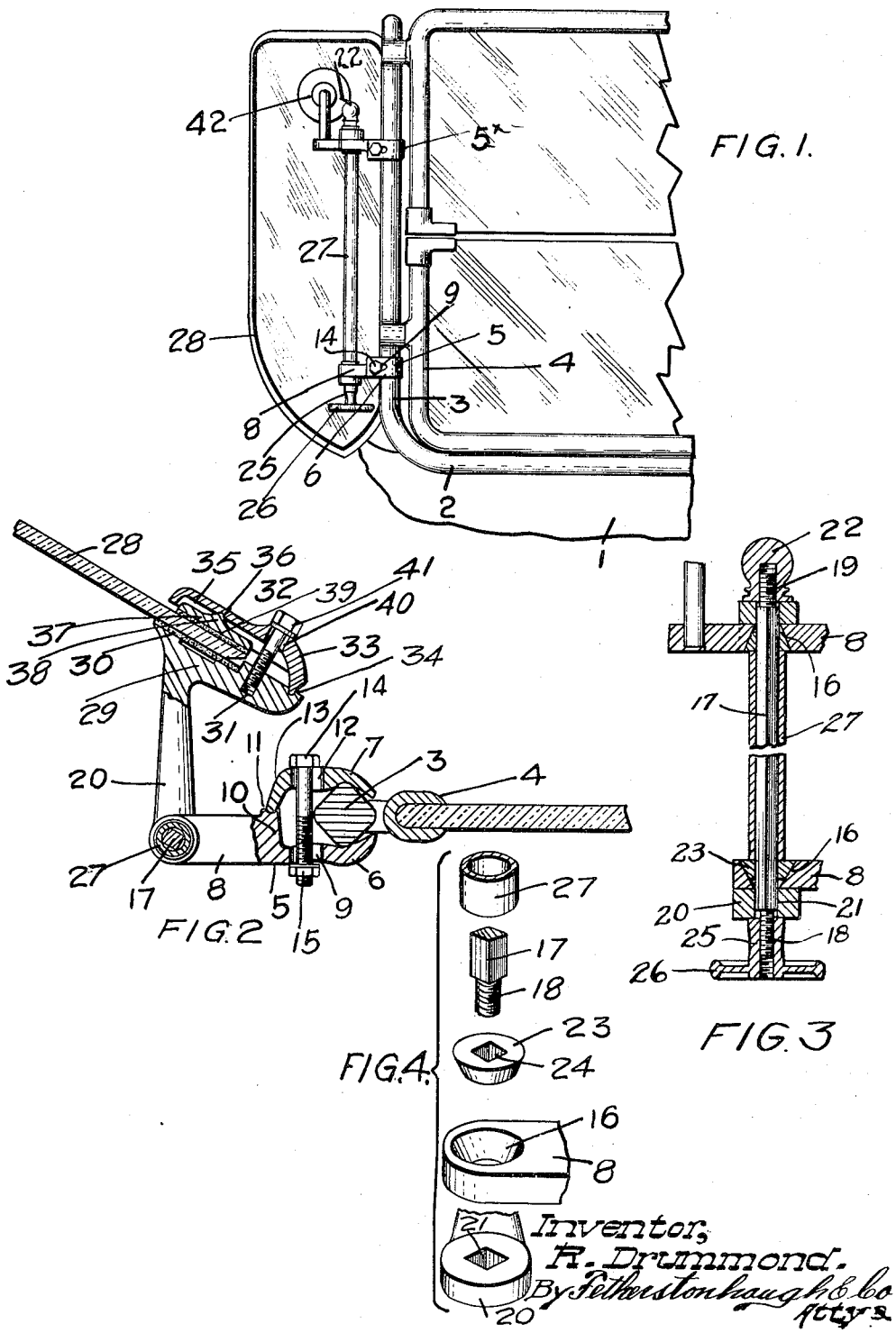

Patented May 6, 1924.

1,493,250

UNITED STATES PATENT OFFICE.

ROBERT DRUMMOND, OF TORONTO, ONTARIO, CANADA, ASSIGNOR TO GEORGE LITTLETON MITCHELL, OF SANTA MONICA, CALIFORNIA.

DEFLECTOR SUPPORT FOR AUTOMOBILE WINDSHIELDS.

Application filed September 20, 1922. Serial No. 589,426.

*To all whom it may concern:*

Be it known that I, ROBERT DRUMMOND, a subject of the King of Great Britain, and a resident of the city of Toronto, in the county of York in the Province of Ontario, Canada, have invented certain new and useful Improvements in Deflector Supports for Automobile Windshields, of which the following is the specification.

My invention relates to improvements in deflector supports for automobile wind shields and the object of the invention is to devise a supporting bracket in which means are provided for positively securing the deflector in any desired angular position to which it may be adjusted and in which such securing means may be operated by one hand for the purpose of adjusting the angular position of the deflector and it consists essentially of the following arrangement and construction of parts as hereinafter more particularly explained.

Fig. 1 is a fragmentary perspective view showing my wind deflector, a portion of a wind shield to which my deflector is connected and a portion of an automobile body upon which the wind shield is carried.

Fig. 2 is an enlarged sectional plan view through a portion of a wind shield, my deflector and the connecting bracket between the deflector and wind shield.

Fig. 3 is a vertical sectional view through the main member of my bracket.

Fig. 4 are enlarged perspective details of the parts located at the lower end of the main member illustrated in Fig. 3 and separated apart.

In the drawings like characters of reference indicate corresponding parts in each figure.

1 indicates a portion of an automobile body, 2 the main supporting bar member carried by the body in the usual manner and having a vertically extending portion 3 located at each end thereof, one only of which is shown. 4 is the wind shield frame which is carried by the vertically extending portions 3 in the usual manner. 5 and 5ˣ are clip brackets each of which is provided with a jawed inner end formed by members 6 and 7.

8 is an arm which extends outwardly from the member 6 of each clip bracket 5 and 5ˣ. The member 6 extends at one side of the vertical portion 3 of a wind shield support and is suitably internally recessed to fit such bar. The jawed member 6 is also provided with a slotted opening 9, such member extending from one side of the arm 8 as clearly indicated in Fig. 2 so as to form a spacing shoulder 10 extending beyond the vertical medial line of the wind shield supporting member 3.

11 is a cross groove formed in the upper edge of the shoulder 10. The other jawed member 7 is also internally recessed to fit the opposite side of the portion 3 and is provided with a slotted opening 12 in a line with the slotted opening 9 and with an inturned portion 13 having a rounded end fitting within the rounded groove 11.

By this means the member 7 is fulcrumed on its inner end against the member 6. 14 is a bolt extending through the slotted openings 9 and 12, such bolt being provided with a nut 15 by which the members 6 and 7 are drawn together, to clamp upon the wind shield supporting member 3. The clip brackets 5 and 5ˣ are suitably spaced apart upon the member 3. The arms 8 of the clip bracket 5 and 5ˣ are each provided with an orifice 16 which is conical in form, the larger end of the orifice 16 of the arm 8 of the clip bracket 5 being upon the upper side of the arm and the corresponding end of the orifice of the clip bracket 5ˣ in the lower side of the arm as is clearly indicated in Fig. 3.

17 is a bolt rod rectangular in cross section and adapted to turn freely within the small end of the orifices 16. The lower end of the bolt rod 17 is provided with a reduced exteriorly threaded portion 18 and the upper end with a similar threaded portion 19.

20 is an arm provided at one end with a rectangular orifice 21. An arm 20 is located in proximity to each end of the bolt rod 17 and below and above the arms extending from the brackets 5 and 5ˣ. The arms 20 are provided at their outer ends with glass clamping members which will be hereinafter described.

22 is a nut which is screwed upon the upper end 19 of the bolt rod 17 against the arm 8 of the clip bracket 5ˣ. The body of the nut 22 may be spherical or any other ornamental shape desired. 23 is a conical member provided with a central rectangular orifice 24. A member 23 fits into the conical orifice 16 of the clip bracket 5 and a member 23 fits into the conical orifice of the clip bracket 5ˣ. The rectangular bolt rod 17 extends through the rectangular orifice 24 of each of the members 23.

The lower end of the rectangular bolt rod 17 extends through the rectangular orifice 21 of the lower arm 20. 25 is a nut which is screwed onto the lower threaded end 18 of the bolt rod 17, such nut being provided with a hand wheel 26 by which it may be operated. 27 is a spacing sleeve which extends between the conical members 23 and around the rectangular bolt rod 17.

It will thus be seen that when the hand wheel 26 is tightened upon the threaded portion 18 that the parts formed by the arms 20, arms 8 and the conical members 23 are drawn together so that the conical members 23 clamp against each end of the spacing sleeve 27 and thereby effectually prevent the swinging movement of the arms 20 in relation to the arms 8. 28 is a wind deflector which is of any desired form and is carried by clamping brackets forming an integral part of the arms 20, which clamp brackets I will now describe.

Each arm 20 is provided with a foot end 29 provided with a leathered face 30 adapted to bear against one face of the glass deflector 28. 31 is an internally threaded orifice formed in the outer portion of the foot 29. 32 is a cap member provided with an in-turned portion 33, the edge of which fits into a bearing groove 34 in which it is fulcrumed. The inner face of the cap 32 is recessed as indicated at 35 in the base of which is located a notch 36. 37 is a movable clamping member provided with a V-shaped projection 38 fitting into the notch 36 thereby permitting the clamping member 37 to centre and adjust itself to the opposing face of the glass deflector 28. The bearing face of the clamping member 37 is suitably leathered as indicated at 39. 40 is an orifice formed in the member 33 opposite the internally threaded orifice 31. 41 is a tap screw extending through the orifice 40 so as to screw into the orifice 41 and thereby draw the parts 32 and 29 together whereby the leather faces 30 and 39 are drawn against the opposite faces of the glass deflector to grip the same. 42 is a mirror which may be supported on the upper stationary arm 8 which is extended as indicated in Figs. 1 and 3.

It will, therefore, be seen that the mirror is mounted in a stationary position absolutely independent of the movement of the deflector and therefore the mirror can be swung to any desired angular position without affecting the position of the deflector.

It will thus be seen that I have devised a very simple device whereby a glass deflector of any size may be secured to the supporting structure by merely adjusting the clip brackets carried by the arms 20 longitudinally of the deflector 28 and the clip brackets 5 and 5ˣ longitudinally of the vertical member 3.

It will also be seen that all it is necessary to do when adjusting the angular position of the deflector is to loosen the nut 25 by operating the hand wheel 26 with one hand swinging the deflector to the desired position and retightening the nut 25 thereby forming a deflector supporting bracket which may be very easily manipulated and adjusted whenever desired and which is readily adaptable to any style of car.

What I claim as my invention is:

1. In a wind deflector for automobile wind shields, a pair of spaced carrier brackets having conical bearing openings, a hinge pin extending through said bearing openings and provided with corresponding conical bearings seated therein to provide pivotal connections between them, a pair of deflector brackets secured to said hinge pin so as to rotate therewith, a deflector secured to the deflector brackets, and means for simultaneously causing binding action between the surfaces of the conical bearings to secure the deflector brackets in adjusted positions.

2. In a wind deflector for automobile wind shields, a pair of spaced carrier brackets having conical bearing openings, a hinge pin extending through said bearing openings and provided with corresponding conical bearings seated therein to provide pivotal connections between them, a pair of deflector brackets secured to said hinge pin so as to rotate therewith, a deflector secured to the deflector brackets, and means carried by the hinge pin for simultaneously causing binding action between the surfaces of the conical bearings to secure the deflector brackets in adjusted positions.

3. In a wind deflector for automobile wind shields, a pair of spaced carrier brackets having conical bearing openings extending in opposite directions with their larger ends opposed, a hinge pin provided with conical bearings seated in said openings and said pin being non-circular in cross section beyond the carrier brackets, a pair of deflector brackets having corresponding non-circular openings to receive said pin, a deflector secured to the deflector brackets, and clamping means carried by the pin beyond the deflector brackets arranged to clamp the deflector brackets to the carrier brackets and the bearings together to secure the deflector in adjusted positions.

4. In a wind deflector for automobile wind shields, the combination with the upper and lower deflector brackets having squared orifices therein and carrier brackets having opposing tapered orifices, a squared hinge pin extending through the tapered orifices of the carrier brackets and fitting the squared orifices of the deflector brackets, an enlargement at one end of the hinge pin, a tightening nut at the opposite end, a spacing sleeve freely surrounding the hinge pin and extending between the carrier brackets, and conical members having squared orifices fitting the hinge pin and tapered to fit the tapered orifices of the carrier brackets.

ROBERT DRUMMOND.